US007043242B2

(12) United States Patent
Kuiri et al.

(10) Patent No.: US 7,043,242 B2
(45) Date of Patent: May 9, 2006

(54) MEASUREMENT METHOD AND DEVICE FOR ACTIVATING INTERFREQUENCY HANDOVER IN A WIRELESS TELECOMMUNICATION NETWORK

(75) Inventors: Tapio Kuiri, Oulu (FI); Harri Lilja, Oulu (FI); Jussi Numminen, Turku (FI); Kaj Jansen, Salo (FI); Sami Haapoja, Helsinki (FI)

(73) Assignee: Nokia Corporation, Espoo (FI)

( * ) Notice: Subject to any disclaimer, the term of this patent is extended or adjusted under 35 U.S.C. 154(b) by 533 days.

(21) Appl. No.: 09/773,275

(22) Filed: Jan. 31, 2001

(65) Prior Publication Data

US 2002/0102941 A1  Aug. 1, 2002

(51) Int. Cl.
*H04Q 7/20* (2006.01)
*H04Q 7/00* (2006.01)

(52) U.S. Cl. .............. 455/436; 455/437; 455/440; 455/443; 455/438; 455/442; 370/331; 370/332; 370/333

(58) Field of Classification Search ............. 455/436, 455/437, 440, 443, 438, 442; 370/331, 332, 370/333
See application file for complete search history.

(56) References Cited

U.S. PATENT DOCUMENTS 5,918,184 A * 6/1999 Wang ..................... 455/561
5,999,816 A 12/1999 Tiedemann, Jr. et al.
6,157,668 A * 12/2000 Gilhousen et al. ........ 375/130

FOREIGN PATENT DOCUMENTS

| EP | 0946076 | 9/1999 |
| EP | 0948231 | 10/1999 |
| GB | 2314734 | 1/1998 |
| WO | 0036867 | 6/2000 |

OTHER PUBLICATIONS

Copy of co-pending U.S. Appl. No. 09/457,918, filed Dec. 9, 1999, entitled "Timing of Handover".

* cited by examiner

*Primary Examiner*—Lee Nguyen
*Assistant Examiner*—Yuwen Pan

(57) ABSTRACT

A method and device for avoiding adjacent channel interference and reducing disconnections caused thereby, during communication between a mobile device and a base station in a wireless telecommunications network. The mobile device measures the strength of a received signal before the signal enters one or more selected filters, and compares the strength of the signal after the filtering, in order to estimate a power ratio of the adjacent channel interference to communication channel power. If the power ratio is greater than a threshold, then a handover is requested to an alternative communication channel available between the mobile device and either the base station or another base station.

40 Claims, 6 Drawing Sheets

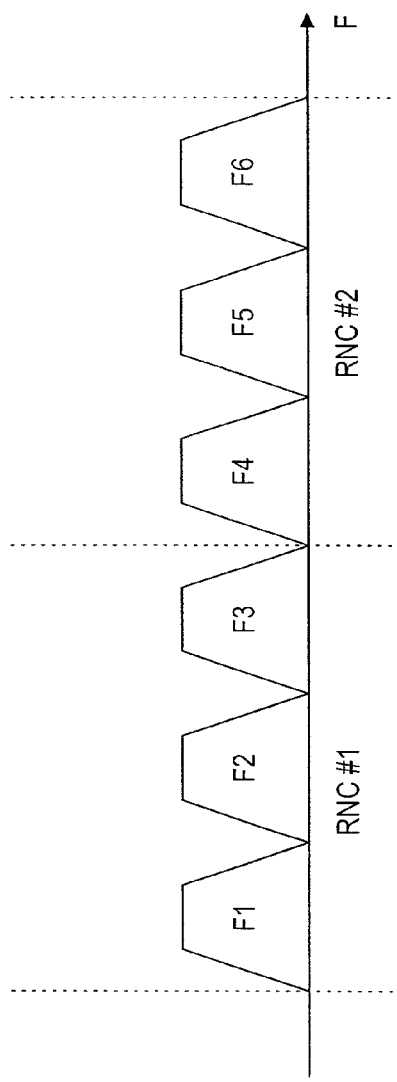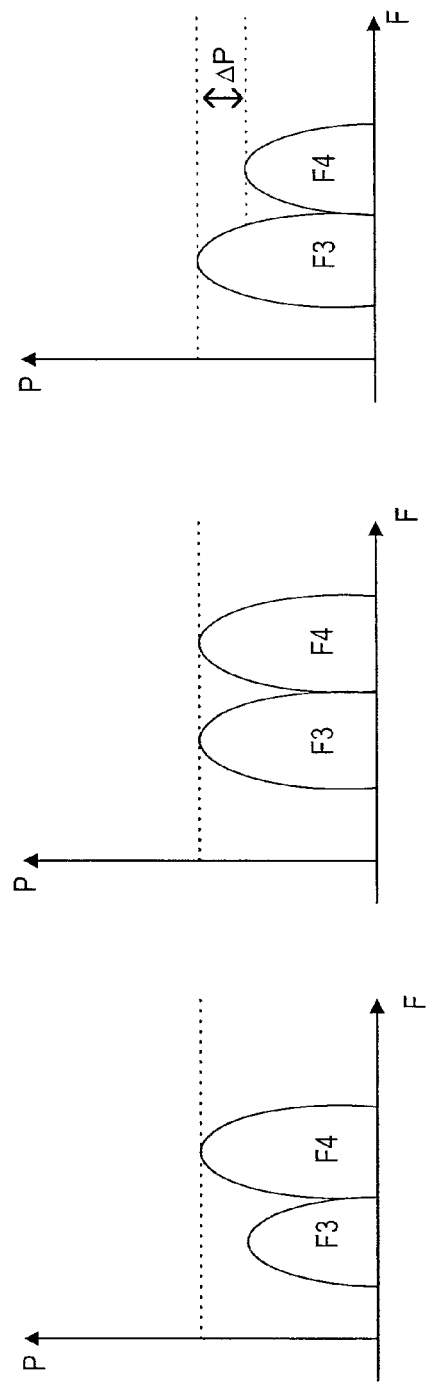

MEASUREMENT METHOD AND DEVICE FOR ACTIVATING INTERFREQUENCY HANDOVER IN A WIRELESS TELECOMMUNICATION NETWORK

TECHNICAL FIELD OF THE INVENTION

The invention relates generally to the field of interference avoidance in a wireless telecommunications network, and relates more particularly to interfrequency handover in order to prevent disconnections caused by adjacent channel interference.

BACKGROUND ART

The prior art and related art arrangements occur in the context of a larger wireless telecommunications system, as exemplified by FIG. 1 which shows the structure of a wireless system according to the Universal Mobile Telecommunications System (UMTS is synonymous with WCDMA or wideband code division multiple access). As can be seen in FIG. 1, the UMTS architecture consists of user equipment 102 (UE which is herein synonymous with "mobile device" and "terminal equipment"), the UMTS Terrestrial Radio Access Network 104 (UTRAN), and the Core Network 126 (CN). The air interface between the UTRAN and the UE is called Uu, and the interface between the UTRAN and the Core Network is called Iu. The UTRAN consists of a set of Radio Network Subsystems 128 (RNS), each of which has geographic coverage of a number of cells 110 (C). The interface between the subsystems is called Iur. Each Radio Network Subsystem 128 (RNS) includes a Radio Network Controller 112 (RNC) and at least one Node B 114, each Node B having geographic coverage of at least one cell 110 (a Node B is often referred to as a base station). As can be seen from FIG. 1, the interface between an RNC 112 and a Node B 114 is called Iub, and the Iub is hard-wired rather than being an air interface. For any Node B 114 there is only one RNC 112. A Node B 114 is responsible for radio transmission and reception to and from the UE 102 (Node B antennas can typically be seen atop tall towers or preferably at less conspicuous locations). The RNC 112 has overall control of the logical resources of each Node B 114 within the RNS 128, and the RNC 112 may also be responsible for handover decisions which entail switching a call from one cell to another or between radio channels in the same cell.

In wireless telecommunications systems, such as the system exemplified by FIG. 1, a signal to be transmitted usually has to be modulated prefatory to data transmission on the transmission channel Uu. The modulation is generally carried out by digital modulation methods which are used to transmit a desired signal on a given frequency band. If the transmitter is nonlinear there will be interference outside the frequency band allocated for signal transmission, such interference being called adjacent channel interference. Linear amplifiers cause only a little interference to adjacent frequency bands, but the power efficiency of linear amplifiers is low, and that is why some nonlinearity is often tolerated even though adjacent channel interference may result.

It is characteristic of a terminal equipment 102 in a wireless system that the terminal equipment's receiver must be able to attenuate even strong signals on an adjacent frequency band. However, adjacent channel attenuation (selectivity) by the receiver is always limited, and cannot operate with complete success when adjacent channel interference becomes large. A certain desired capability for adjacent channel attenuation value is determined for terminal equipment receivers in the system, and the receivers should attain this desired value. Therefore, each terminal equipment 102 has a particular known ability to attenuate an adjacent channel signal in order to reduce adjacent channel interference.

In some situations, adjacent channel interference increases to such an extent that the connection may be disconnected. This is called blocking of a receiver. In such a situation, it is important that an interfrequency handover can be performed rapidly and at a correct moment, in order to prevent disconnection. FIG. 2 shows the terminal equipment 102 (UE) communicating with a first base station 202 (B1) which is one of the base stations 114 in the system. Frequency F4 is used over the Uu connection in the downlink direction (B1→UE). However, the mobile device 102 is also situated close to a second base station 204 (B2), which transmits to its own mobile devices on frequency F3. In other words, the cells 110 associated with the first base station 202 and the second base station 204 overlap at the point where user equipment 102 is located. If frequencies F4 and F3 are adjacent frequency bands on the frequency range, the transmission of the second base station 204 appears to the UE 102 as adjacent channel interference, since UE's receiver selectivity is not ideal. Assume that B1 202 and B2 204 are, for example, base stations of different network operators, in which case the UE 102 cannot perform a handover to B2 204. As the interference becomes stronger, there is a risk of the connection between the UE 102 and B1 202 being disconnected.

In some prior art arrangements, a terminal equipment UE 102 measures the strengths of signals from base stations 114. The purpose of the measurements is to search for handover candidates having a strong received downlink signal, but this procedure becomes problematic in the aforementioned situation where a candidate base station 204 is located on another frequency to which the terminal equipment 102 cannot perform a handover. Furthermore, the process of directly measuring signal strengths from different base stations 114 is problematic because, even if that process occurs only at specific intervals rather than continuously, the process may intermittently detract from the terminal equipment's normal communication capacity.

In some prior arrangements, the interference caused by the terminal equipment's own transmission in the uplink direction (UE→B1) to other terminal equipments of another network operator is estimated on the basis of signal strengths measured from base station transmissions, and this is used as a basis for a handover. However, this method does not take into account the interference to the terminal equipment's own connection, which means that the handover is not carried out in the best possible manner for the terminal equipment since the call may be blocked before the handover is completed.

In another related art arrangement, a terminal equipment UE 102 communicates with a first base station B1 202 on a particular frequency band and measures that first received signal strength. Periodically, the terminal equipment 102 also measures a second received signal strength on an adjacent frequency band used by a second base station 204. If the second signal strength exceeds the first signal strength by a given threshold, then an interfrequency handover is performed so that the terminal equipment 102 continues to communicate with the first base station 202 at a different frequency. That type of arrangement is disclosed in the related art of Haemaelaeinen et al. (European patent number WO/0036867), and is also disclosed in copending U.S. application Ser. No. 09/457,918 (filed Dec. 9, 1999 and expressly incorporated by reference as background). However, that type of arrangement is problematic because a terminal equipment 102 will have lower communication capacity due to interfrequency monitoring, inasmuch as the terminal equipment 102 must regularly shift to another frequency for purposes of signal strength measurement. This problem of capacity loss can be alleviated by employing a second receiver within the same terminal equipment 102, but a second receiver would entail significant increase in cost.

DISCLOSURE OF THE INVENTION

According to this invention, a terminal equipment is able to provide a handover information signal that determines whether a handover to an alternative communication channel will occur. The terminal equipment accomplishes this by comparing the adjacent channel interference to the terminal equipment's own communication channel power, without any need for the terminal equipment to visit, monitor, or directly measure the adjacent channel being used by another base station. In other words, a terminal equipment is able to avoid adjacent channel interference, and thus the likelihood of disconnection, by switching communication to an alternative communication channel, for example an alternative frequency channel. The mobile terminal is able to use the communication channel unhindered, up until the handover.

In addition to avoiding interference and reducing risk of disconnection, the present invention is able to substantially maintain the terminal equipment's communication capacity, without requiring any major additional parts such as an additional receiver. According to this invention, the terminal equipment is able to compare adjacent channel power to communication channel power by examining the strength of a received signal before filtering the received signal and then again examining the strength of the received signal after filtering.

When the adjacent channel power becomes so great with respect to the communication channel power that there may be a risk of disconnection, a handover is requested which may be a frequency handover (that request may originate either in the mobile device or on the network side). A frequency handover is to a different frequency with the same base station, or it may be to a different frequency with a different base station, although in the latter case it may be necessary that the base stations share the same network operator. In either case, the present invention allows a more efficient handover decision procedure. Instead of the terminal equipment testing signal strengths on different frequencies or channels that are associated with different base stations, the terminal equipment of the present invention is capable of deducing adjacent signal strength based upon the effects of adjacent channel interference. Note that the terms adjacent channel power and adjacent channel interference will be used interchangeably throughout this specification, because, even if these two things are not identical to each other, they can be deduced from each other (i.e. each can be regarded as a function of the other).

The method and device of the invention thus have several advantages. The timing of interfrequency handover can be optimally selected without interfrequency monitoring which would detract from normal communication capacity on the communication channel. Also, no costly additions to the terminal equipment, such as an additional receiver, are required in order to optimize interfrequency handover. Furthermore, the invention facilitates interfrequency handover in situations where the handover is from one base station to another, in addition to the situation where the terminal equipment maintains communication with the same base station both before and after interfrequency handover.

BRIEF DESCRIPTION OF THE DRAWINGS

FIG. 4 is a diagram showing two groups of mutually adjacent frequency bands.

FIGS. 5a to 5c show examples of adjacent channel power relative to communication channel power as the mobile device moves.

BEST MODE FOR CARRYING OUT THE INVENTION

Figure 1:
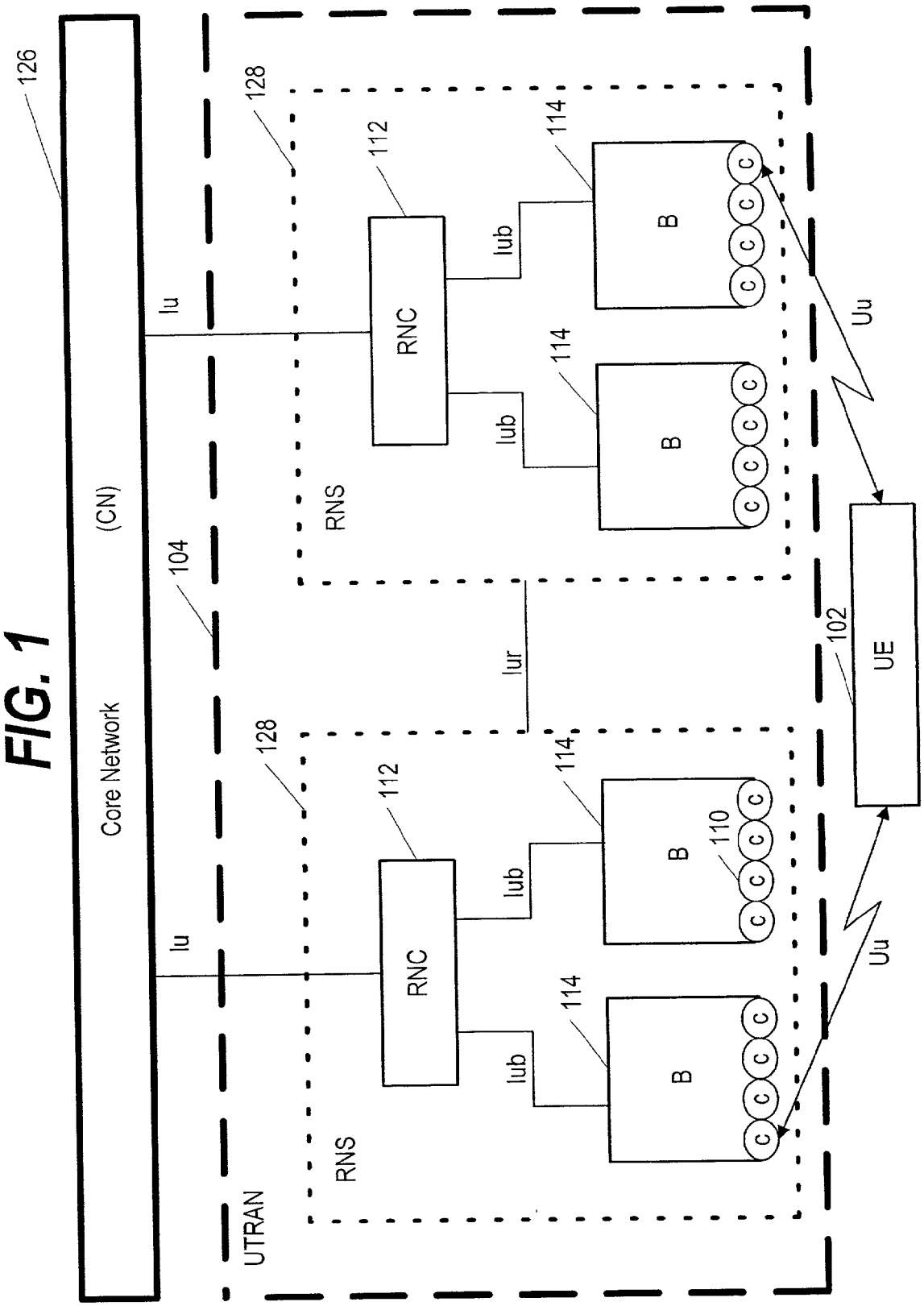
FIG. 1 is a diagram showing the structure of a wireless communication system used as an example.
Figure 2:
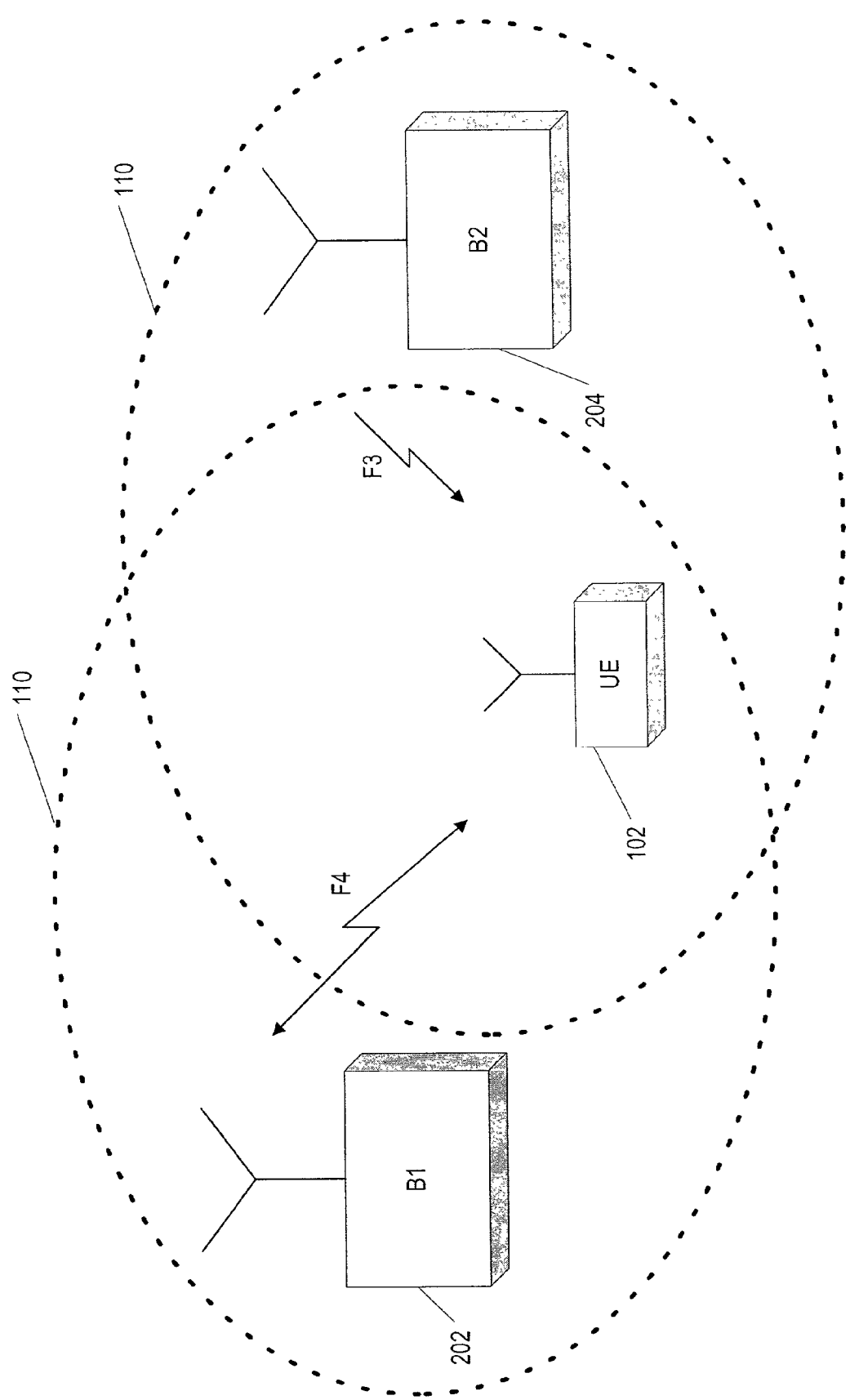
FIG. 2 shows a user equipment communicating with a first base station while subject to adjacent channel interference from a second base station.

An embodiment of the best mode of the present invention can be implemented in the wireless telecommunications network environment shown by FIGS. 1 and 2. The present invention optimizes the air interface (Uu) between user equipment 102 and base stations 114 (base stations are also called Node B's in UMTS). The user equipment 102 of the present invention is capable of optimizing the interface Uu by avoiding the adjacent channel interference F3 shown in FIG. 2, and the terminal equipment 102 is thus able to reduce disconnections caused by the adjacent channel interference. This optimization method is implemented while the terminal equipment 102 and the base station 202 are communicating via a communication channel (F4), instead of involving interruptions of communication.

Figure 3:
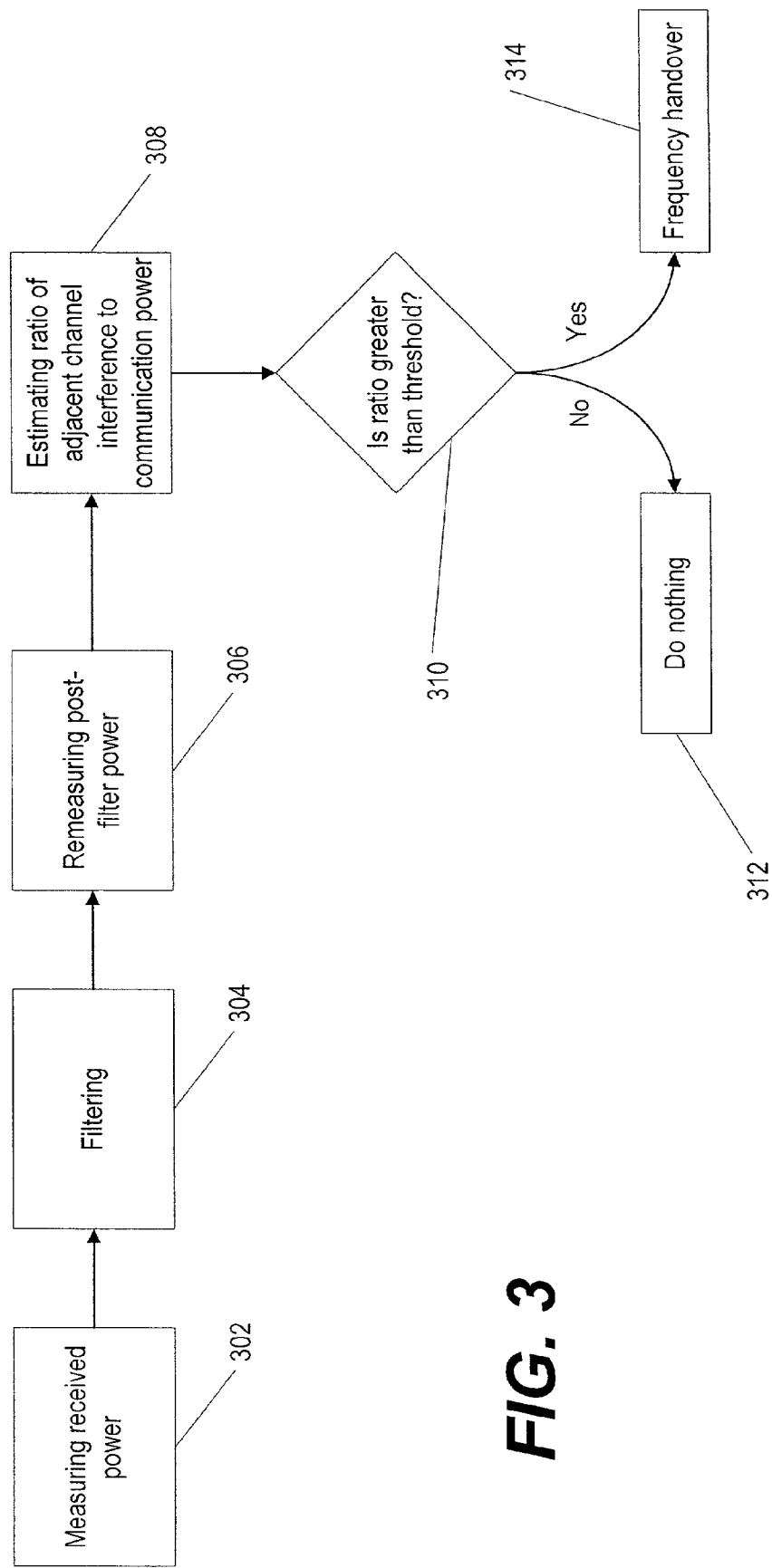
FIG. 3 is a flow chart showing an embodiment of the present method.

The method is depicted by the flow chart of FIG. 3. A received signal has already been processed to some extent by the terminal equipment 102 (this processing may include some filtering), but has not yet reached at least one selected filter. The terminal equipment 102 measures received power of the received signal in a step 302 at a point before the received signal enters the at least one selected filter within the terminal equipment. Filtering step 304 provides a filtered signal in response to the received signal, and the post-filter power of the filtered signal is then measured in a remeasuring step 306. The foregoing steps preferably occur within the mobile device. From the received power and the post-filter power (both of which have now been measured), a power ratio is estimated in a step 308, which indicates the degree to which the adjacent channel interference exceeds communication channel power. Then, it is determined whether or not the power ratio of the adjacent channel interference to the communication channel power is greater than a certain threshold, in a step 310 which may occur either within the user equipment or on the network side; in the latter case, channel handover information (including the power ratio) may first be reported by the UE to the network. If the answer is "yes" then a frequency handover is requested in a step 314, to an alternative frequency channel available for data transmission to and from the terminal equipment (an embodiment is also possible wherein the handover is to a channel having the same frequency but different communication parameters). However, if the answer is "no" then no interfrequency handover is requested either by the UE or on the network side, as indicated by a step 312. The foregoing steps are performed while the mobile device is capable of using the communication channel, instead of causing interruptions or discontinuities in the usage of the communication channel (of course, if a handover request subsequently results in handover activation, then a different communication channel may be used at that time).

In a best mode embodiment, the filtering step 304 is done using at least one digital pulse-shaping filter. Moreover, the received signal, which is measured in the step 302 prior to entering the digital pulse-shaping filter, has been converted from analog to digital. The received signal which is measured in the step 302 has been bifurcated into in-phase and quadrature components, and this processing can occur either before or after the conversion to digital (normally before). Thus, in a best mode embodiment, measuring received power in the step 302 is done after the received signal is bifurcated into in-phase and quadrature components, after the received signal is filtered by means of at least one analog filter, and after the received signal is converted from analog to digital; these aspects of the invention will be further discussed below in conjunction with aspects of the device for carrying out the method (the illustrations of the device are amply illustrative of the method).

The frequency handover step 314 can either be to another frequency of the same base station, or to another frequency of a different base station, depending upon the circumstances. If the handover step 314 is necessarily to another frequency of the same base station (e.g. if the other base station has a different network operator), then the frequency handover step 314 to an alternative frequency channel involves an alternative frequency channel that is adjacent to the communication channel, and is one of a group of mutually adjacent frequency channels which are associated with the base station throughout base station coverage area. This group of mutually adjacent frequency channels is different from all other groups of mutually adjacent frequency channels associated with other base stations having other coverage areas overlapping at least partly with the base station coverage area. FIG. 4 illustrates this type of situation, in which a handover from one base station to another base station is not possible or desirable, because one group of mutually adjacent frequency channels (F1, F2, F3) and a neighboring group of mutually adjacent frequency channels (F4, F5, F6) are separately controlled. In other words, in these circumstances, the two groups of channels are controlled by separate radio network controllers 112, and therefore an interfrequency handover normally will not cause the terminal equipment 102 to change base stations. If, however, the two groups of channels are controlled by the same radio network controller 112, then an interfrequency handover may cause the terminal equipment 102 to stop communicating with the base station 202 and start communicating with a different base station 204.

FIGS. 5a, 5b, and 5c exemplify results of the measuring process according to the present invention, as the terminal equipment 102 changes position relative to its own base station 202 and relative to another base station 204. Power is plotted on the vertical axis, and frequency on the horizontal. In FIG. 5a, we see that the adjacent channel interference F3 is less than the communication channel power F4. However, when the terminal equipment UE moves closer to the other base station 204, the adjacent channel interference F3 increases to the point where both signal strengths are approximately equal. Even though the strength of the interfering signal equals the strength of the communication signal in the situation shown in FIG. 5b, the connection is not yet at risk of being disconnected because, for example, the interference can be decreased by filtering at the receiver. As the UE 102 changes its position and the signal strength of the other base station 204 increases, the method of the present invention can be repeated more often, and conversely, if the signal strength of the other base station 204 decreases, then the method of the present invention can be repeated less often. In any case, FIG. 5c shows an increased signal F3 from base station 204, and therefore the connection quality may be at risk since the adjacent channel signal is so strong that the adjacent channel selectivity of the mobile device's receiver is no longer sufficient. Depending on whether the power difference P reaches a certain threshold level, a frequency handover is activated before the connection is disconnected.

According to an embodiment of the best mode, the step of measuring post-filter power occurs before despreading occurs and before decoding occurs, and wherein all steps occur within a wideband code division multiple access (WCDMA) system such as the system illustrated in FIG. 1. However, it is also possible that despreading occurs before the step of remeasuring post-filter power, but after the step of measuring received power.

Once a frequency handover is requested, it is important that the frequency handover actually be activated if needed. This process of handover activation will usually, but not necessarily, be controlled by the radio network controller RNC 112; activation of the handover operation changes the communication between the terminal equipment and the base station to the alternative channel, and may also change the communication from one base station 202 to another base station 204. Although the method described thus far has involved partially overlapping cells, it is equally applicable where one of the coverage areas is a microcell situated completely within a base station coverage area.

A central feature of the best mode of the present invention is that the method occurs in parallel with normal reception and normal communication capacity on the communication channel. In other words, the present method does not require normal communication to be limited or to be confined to certain periods of time during which this method is not being used.

Regarding the threshold power ratio which triggers a handover request, a best mode embodiment of the invention requires that this threshold be less than or equal to maximum ratio of adjacent channel interference to communication power tolerated by the terminal equipment with negligible risk of disconnection. This threshold can vary from one terminal equipment to the next, depending upon the equipment design, and particularly depending upon the terminal equipment's susceptibility to disconnection. The threshold can also be variable in time, and from one base station to another.

In an embodiment of the best mode of the present invention, the step of estimating the ratio between the adjacent channel interference and the communication channel power is also dependent upon analog filter attenuation which occurs in the terminal equipment prior to the received signal being provided by the analog-to-digital-converter. The analog filter attenuation is typically known from the production tuning process that occurs when the terminal equipment is produced, so analog attenuation need not be measured by the terminal equipment itself.

It should be borne in mind that data transmission between a terminal equipment 102 and a base station 202 may employ uplink frequencies which are separated from downlink frequencies by a given duplex spacing. Thus, certain adjustments or changes to the downlink frequency would be accompanied by similar actions with regard to uplink, as dictated by the given frequency duplex spacing. The frequency duplex spacing may be either variable or constant or, in the case of a time division duplex (TDD) system, nonexistent.

Figure 6:
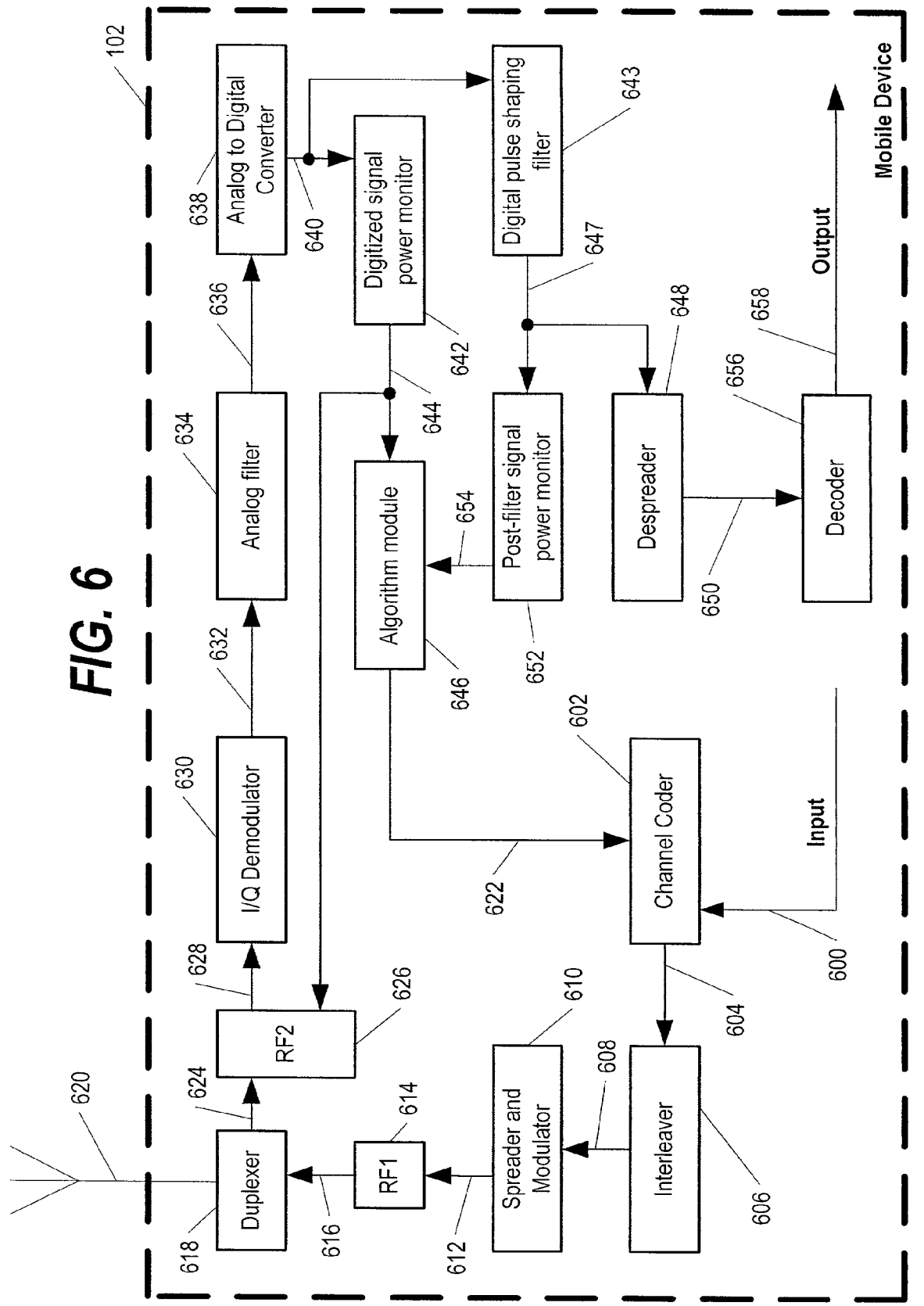
FIG. 6 is a block diagram of certain parts of the mobile device according to an embodiment of the present invention, including the various signals between the blocks.

Referring now to FIG. 6, a structure of the mobile device 102 is detailed in accordance with an embodiment of the best mode of the present invention, and this Figure also illustrates the various interactions within the mobile device 102 in a way that clearly illustrates both the device and the method of the present invention. It is to be understood that all of the Figures, and the accompanying narrative discussions in this specification, represent a simplified structure. For example, FIG. 6 only shows certain relevant blocks of the mobile device, as will be evident to a person skilled in the art. Such a person will also understand that these blocks and their interactions may be rearranged and supplemented within the scope of the present invention, and will understand that these blocks do not necessarily represent discrete hardware components; rather, these blocks can be implemented by combinations of hardware and software in a variety of different combinations and permutations. Likewise, the signals between these blocks represent general cause-and-effect relationships that do not exclude intermediate interactions of various types, as will be clear to those skilled in the art.

The mobile device 102 shown in FIG. 6 can best be understood by beginning with the input signal 600; this is a signal to be transmitted, and has already been subjected to some form of source coding, such as speech coding. The input signal 600 is supplied to a channel coder 602 which may utilize, for example, different codes such as cyclic redundancy check, as well as other methods like convolutional coding and different modifications thereof (e.g. punctured convolutional coding and turbo coding). The channel coder 602 then sends a coded signal 604 to and interleaver 606 which facilitates error correction at the receiving end, by making the transmitted information possible to identify even if momentary fading occurs over the radio path. The interleaver then sends a premodulated signal 608 to a spreader and modulator 610 which spreads the signal by a spreading code mixed with a mixing code, and produces a spread signal 612. The spread signal 612 passes to a radio frequency module 614 (RF1) which may comprise different power amplifiers and filters restricting the bandwidth, and from RF1 614 emerges an analog signal 616 that is transmitted via a duplexer 618 and an antenna 620 to the radio path.

Thus far, we have focused on the transmitter side of the mobile device 102, and it should also be mentioned that this transmitter side will transmit channel handover information when that information is generated according to the method already discussed (i.e. the channel handover information may include either a handover request or other information such as the power ratio which is needed to decide if a handover should be requested). This is represented in FIG. 6 by a handover information signal 622 that is shown entering the channel coder 602, although the handover information signal 622 may enter the transmitter side of the mobile device 102 at either an earlier or a later stage of the pre-transmission process.

Turning now to the receiver part of the mobile device 102, as shown in FIG. 6, an analog RF signal is received from the radio path by an antenna 620 and is supplied to a duplexer 618. The duplexer 618 provides a duplexed signal 624 to a second radio frequency module 626 (RF2) which comprises a filter that blocks frequencies outside the desired frequency band. From RF2 626 emanates a once-filtered signal 628 which is provided to an I/Q demodulator 630. A demodulated signal 632 having in-phase and quadrature components is then sent from the I/Q demodulator 630 to an analog filter 634 which further attenuates the adjacent channels. This analog filter 634 preferably consists of I and Q low-pass filters. The analog filter 634 sends a twice-filtered signal 636 to an analog-to-digital converter 638 which samples and quantizes the signal and provides a digital received signal 640. A digitized signal power monitor 642 measures the signal strength of the digital received signal 640 and provides a digital received power measurement signal 644 to two units of the mobile device 102: to the RF2 626 and to an algorithm module 646. The purpose of sending the digital received power measurement signal 644 to the RF2 626 is so that the automatic gain control of the RF2 626 can be properly controlled, thus keeping the signal level suitable for the A/D converter 638. The digital received signal 640 also proceeds to a selected digital signal filter, preferably a digital pulse-shaping filter 643, which reduces undesirable frequency components and provides a digitally filtered signal 647 to a despreader 648. The despreader 648 provides a despread signal 650 to a decoder 656 that responds by providing an output signal 658 that may be further processed before finally reaching the user. A post-filter signal power monitor 652 may measure signal strength either before or after despreading (or both), and FIG. 6 shows the case where this measurement is performed before despreading. The post-filter signal power monitor 652 provides a digital filtered power measurement signal 654 to the algorithm module 646. The algorithm module 646 then responds to the digital filtered power measurement signal 654 and the digital received power measurement signal 644; the latter signal has a magnitude indicative of communication channel power combined with a remainder of adjacent channel interference, and the former signal has a magnitude indicative of communication channel power. In this embodiment, the algorithm module 646 calculates an estimated power ratio of adjacent channel interference to communication channel power. If this power difference is greater than a selected threshold of the particular mobile device 102, then the algorithm module 646 may provide a handover information signal 622, either to the channel coder 602 as shown in FIG. 6, or to some other component, to be transmitted. The handover information signal 622 may have a magnitude indicative of a requested channel that is untested (i.e. not directly measured) by the mobile device 102 and to which frequency a frequency handover is requested. Alternatively, the handover information signal 622 may simply signify that an interfrequency handover is desired, or the handover information signal 622 may indicate the power ratio (or, for example, both the numerator and denominator of that ratio) so that a component of the wireless communication network outside the mobile device will determine whether a handover will occur (e.g. by comparing the power ratio to a variable threshold established by a component of the wireless network other than the UE). In any of these cases, it is unnecessary according to the present invention for the mobile device to directly test other channels, and thus the present invention prevents a waste of valuable communication capacity.

Figure 7:
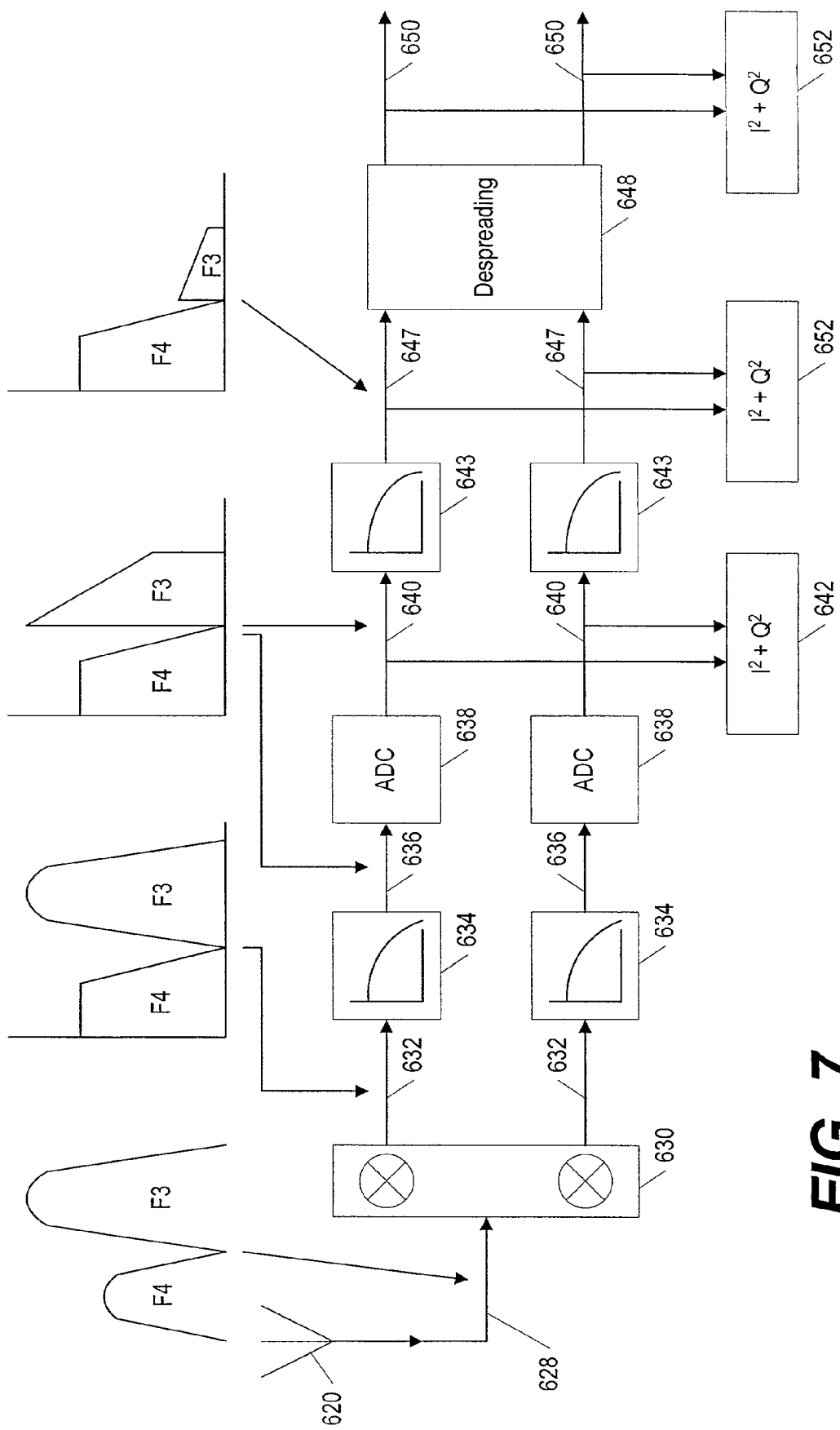
FIG. 7 is a diagram showing the bifurcated nature of the signal processing according to an embodiment of the present invention.

FIG. 7 shows another depiction of the invention from a perspective that highlights processing of the in-phase and quadrature components. FIG. 7 is somewhat similar to FIG.

6, and shows many of the same blocks and signals, but for the purposes of FIG. 7 several components are omitted. FIG. 7 explicitly shows the demodulated signal 632 having in-phase and quadrature components. Furthermore, FIG. 7 explicitly shows how the relationship between the processed F3 adjacent channel interference and the processed signal F4 changes during the course of processing. As in FIGS. 2, 5a, 5b, and 5c, the communication channel frequency is given by F4 in FIG. 7, and the adjacent channel interference by F3.

The aim of the device shown in FIG. 7 is to measure when the adjacent channel signal power (i.e. the adjacent channel interference) is too high for the receiver, at which time a frequency handover can be requested, or at least handover information can be sent from the UE to the base station. Assume that the receiver can tolerate a certain (e.g. 35 dB or 40 dB) higher adjacent channel signal before there is a significant risk of disconnecting the communication channel signal. If this maximum tolerated level is being approached, then the handover information can be sent to the base station, including either a handover request or other relevant information such as the power ratio and/or the value of the maximum tolerated higher adjacent channel.

Mobile receivers typically filter adjacent channel interference both on the analog side (in the radio frequency section and/or in the base band sections), and also on the digital side with a digital pulse-shaping filter 643. As shown in FIG. 7, signal powers are measured immediately before and immediately after the signal is processed by the digital pulse shaping filter 643, and the mobile device compares these two signal powers. The signal attenuation on the analog side (i.e. prior to the analog-to-digital converter 638) is already known from the production tuning that occurred when the mobile device was manufactured. Based on the measured digital attenuation and the known analog attenuation, it is possible to calculate the adjacent channel signal difference compared to the communication signal and/or thermal noise, and this information can then be used to determine whether an interfrequency handover is necessary due to imminent disconnection risk. FIG. 7 also shows the signal power being measured after despreading, and this information may be useful in calculating signal power ratio and thus in determining whether interfrequency handover is needed in CDMA systems.

It will useful to grasp some of the important principles which underlie a best mode embodiment. As is known in the art, the relationship between the powers "A" and "B" of any two signals can be expressed as a decibel (dB) number "C" such that:

$$C = 10\ Log_{10}(A/B). \tag{1}$$

Of course, due to the definition of a logarithm, equation (1) can be rewritten like this:

$$A/B = 10^{C/10}. \tag{2}$$

Referring now to FIG. 6, the power of the digitally filtered signal on the line 647 is indicated by the digital filtered power measurement signal on the line 654 and that power $P_{own}$ approximately gives the power of the mobile device's own communication channel, because the adjacent channel power $P_{adj}$ has largely been eliminated by attenuation accomplished by the analog and digital filters. The relationship between $P_{own}$ and $P_{adj}$ can be expressed by "X" where:

$$X = 10\ Log_{10}(P_{adj}/P_{own}). \tag{3}$$

As mentioned above, the mobile device will be able to tolerate a value of "X" up to a certain maximum amount, for example $X \leq 40$ dB, before there is a significant risk that the communication signal will be lost. In the example where $X \leq 40$ dB, $P_{adj}$ could be up to ten thousand times greater than $P_{own}$ according to equation (3).

In this embodiment of the present invention, it is necessary for the algorithm module 646 to calculate X in order to determine whether X exceeds a certain threshold value, in which case a frequency handover will be requested. Referring again to FIG. 6, the power of the digital received signal on the line 640 is indicated by the digital received power measurement signal on the line 644, and that power $P_{in}$ includes both the mobile device's own communication channel power $P_{own}$ as well as the analog-attenuated power remainder $P_{rem}$ of the adjacent channel.

$$P_{in} = \sqrt{(P_{own})^2 + (P_{rem})^2}. \tag{4}$$

It is known from production tuning that:

$$Y = 10\ Log_{10}(P_{rem}/P_{adj}). \tag{5}$$

The algorithm module 646 knows both $P_{in}$ and $P_{own}$ from the signals on the lines 644 and 654 respectively, and "Y" is known from production tuning, and therefore the algorithm module can algebraically calculate $P_{adj}$ from equations (4) and (5), and then find "X" from equation (3). Thus, the algorithm module 646 will determine whether X is so great as to threaten blocking of the receiver, based upon the measured signal strength values before and after the digital pulse shaping filter 643. Thereafter, a channel handover such as an interfrequency handover will be able to prevent blocking of the receiver that could otherwise occur.

A useful way to view a best mode embodiment of the present invention is as a system which includes the mobile device (102) and the radio network subsystem (128) shown in FIG. 1. The mobile device is responsive to a received signal transmitted over the wireless interface Uu, and provides the handover information (128), provides the received signal to the mobile device (102), and is responsive to the handover information signal by switching the communication to an alternative communication channel if the power ratio exceeds a certain threshold, as described above. The power ratio is determined inside the mobile device (102) by measuring signal power before and then after the received signal is filtered by at least one selected filter. It will easily be seen by those skilled in the art that this system may be detailed and limited as described throughout this specification.

Although this invention has been shown and described with respect to best mode embodiments thereof, it should be understood by those skilled in the art that the foregoing and various other changes, omissions and additions in the form and detail thereof may be made therein without departing from the spirit and scope of the invention.

What is claimed is:

1. A method of avoiding adjacent channel interference and reducing disconnections caused thereby, during communication between a mobile device (102) and a base station (202) that communicate via a communication channel in a wireless communication network, comprising the steps of:

measuring (302) received power of a received signal at a point before the received signal is filtered by at least one selected filter within the mobile device (102), for providing a received power measurement signal having a magnitude indicative thereof, filtering (304) the received signal, for providing a filtered signal, remeasuring (306) post-filter power of the filtered signal, for providing a filtered power measurement signal having a magnitude indicative thereof, estimating (308) from the received power measurement signal and the filtered power measurement signal a power ratio having a magnitude indicative of a degree to which the adjacent channel interference exceeds communication channel power, and requesting (314) a handover to an alternative communication channel available for data transmission to and from the mobile device via said alternative communication channel, if (310) said power ratio is greater than a certain threshold, wherein the steps of measuring (302), filtering (304), remeasuring (306), and estimating (308) are performed while the mobile device is capable of using the communication channel for receiving and transmitting data, wherein both the communication channel and the alternative communication channel are for communication between the mobile device (102) and the base station (202); and wherein the power ratio is substantially determined by adjacent channel power divided by communication channel power, the communication channel power being substantially given by the magnitude of the filtered signal, and the adjacent channel power being calculated as a function of both the magnitude of the filtered signal and the magnitude of the received signal.

2. The method of claim 1, wherein the steps of measuring (302), filtering (304), and remeasuring (306) are performed within the mobile device.

3. The method of claim 2, wherein all steps are accomplished by the mobile device.

4. The method of claim 2, wherein the power ratio is reported by the mobile device (102) to the base station (202), and wherein the handover is requested by a component of the wireless communication network other than the mobile device.

5. The method of claim 1, wherein the received signal is digital, having previously been converted from analog to digital, and wherein the at least one selected filter comprises a digital pulse shaping filter.

6. The method of claim 5, wherein the step of estimating (308) the ratio of the adjacent channel interference to the communication channel power is also dependent upon analog filter attenuation which occurs in the mobile device prior to the received signal being provided by the analog-to-digital-converter, and wherein the analog filter attenuation is known from production tuning.

7. The method of claim 1, wherein the received signal has in-phase and quadrature components.

8. The method of claim 1, wherein the at least one selected filter comprises a digital pulse shaping filter, and also wherein the step of measuring (302) received power is preceded by the steps of:

processing the received signal so that the received signal comprises in-phase and quadrature components, filtering the received signal by means of at least one analog filter, and converting the received signal from analog to digital.

9. The method of claim 1, wherein the alternative communication channel is adjacent to the communication channel, and is one of a group of mutually adjacent frequency channels which are associated with the base station throughout base station coverage area, and also wherein the group of mutually adjacent frequency channels is different from all other groups of mutually adjacent frequency channels associated with other base stations having other coverage areas overlapping at least partly with the base station coverage area.

10. The method of claim 9, wherein the step of remeasuring (306) post-filter power occurs before despreading occurs and before decoding occurs, and wherein all steps occur within a wideband code division multiple access system.

11. The method of claim 9, wherein at least one of the other coverage areas is a microcell situated completely within the base station coverage area.

12. The method of claim 9, wherein all steps occur before decoding occurs, wherein all steps occur within a code division multiple access system, wherein despreading occurs before the step of remeasuring (306) post-filter power, and wherein despreading occurs after the step of measuring (302) received power.

13. The method of claim 9, wherein the data transmission between the mobile device (102) and the base station (202) employs uplink frequencies which are separated from downlink frequencies by a duplex spacing.

14. The method of claim 1, wherein the base station (202) activates a handover operation after receiving a handover request from the mobile device (102), and wherein activation of said handover operation will change the communication between the mobile device (102) and the base station (202) to the alternative communication channel.

15. The method of claim 1, wherein the method occurs in parallel with normal reception and normal communication capacity on the communication channel.

16. The method of claim 1, wherein the certain threshold is less than or equal to a maximum ratio of adjacent channel interference to communication channel power tolerated by the mobile device (102) with negligible risk of disconnection.

17. A mobile device (102) for communicating with a base station (202) in a wireless communication network, while avoiding adjacent channel interference and reducing disconnections caused thereby, comprising:

a digitized signal power monitor (642), responsive to a digital received signal (640), for providing a digital received power measurement signal (644) having a magnitude indicative of communication channel power combined with a remainder of adjacent channel interference;

at least one selected filter (643), responsive to the digital received signal (640), for providing a digitally filtered signal (647);

a post-filter signal power monitor (652), responsive to the digitally filtered signal (647), for providing a digital filtered power measurement signal (654) having a magnitude indicative of the communication channel power;

an algorithm module (646), responsive to the digital received power measurement signal (644) and the digital filtered power measurement signal (654), for providing a handover information signal (622) having a magnitude which will be used outside the mobile device to determine whether a handover to an alternative communication channel will occur, wherein both the communication channel and the alternative communication channel are for communication between the mobile device (102) and the base station (202); and wherein the power ratio is substantially determined by adjacent channel power divided by communication channel power, the communication channel power being substantially given by the magnitude of the filtered signal, and the adjacent channel power being calculated as a function of both the magnitude of the filtered signal and the magnitude of the received signal.

18. The mobile device of claim 17, wherein the magnitude of the handover information signal (622) is indicative of a handover request, if an estimated power ratio of adjacent channel interference to the communication channel power is greater than a certain threshold of the mobile device.

19. The mobile device of claim 18, wherein the certain threshold is less than or equal to a maximum ratio of adjacent channel interference to communication power tolerated by the mobile device (102) with negligible risk of disconnection.

20. The mobile device of claim 17, wherein the magnitude of the handover information signal (622) is indicative of an estimated power ratio of adjacent channel interference to the communication channel power.

21. The mobile device of claim 20, wherein the magnitude of the handover information signal (622) is further indicative of a maximum acceptable upper threshold for the estimated power ratio.

22. The mobile device of claim 20, wherein the handover will occur if the estimated power ratio is greater than a certain threshold established by a component of the wireless communication network other than the mobile device.

23. The mobile device of claim 22, wherein the certain threshold is variable from a base station to another, and from a time to another.

24. The mobile device of claim 17, further comprising:
a demodulator (630), responsive to a once-filtered signal (628), for providing a demodulated signal (632) having in-phase and quadrature components,
at least one analog filter (634), responsive to the demodulated signal (632), for providing a twice-filtered signal (636); and
an analog-to-digital converter (638), responsive to the twice-filtered signal (636), for providing the digital received signal (640),
wherein the at least one filter comprises a digital pulse shaping filter (643).

25. The mobile device of claim 24, wherein the algorithm module (646) is responsive to analog filter attenuation magnitude which is known from production tuning, for determining whether the estimated power ratio of the adjacent channel interference to the communication channel power is greater than the certain threshold.

26. The mobile device of claim 17, wherein the requested frequency channel is one of a group of mutually adjacent frequency channels which are associated with the base station (202) throughout base station coverage area, the group of mutually adjacent frequency channels being different from all other groups of mutually adjacent frequency channels associated with other base stations having other coverage areas that overlap at least partly with the base station coverage area.

27. The mobile device of claim 26, further comprising:
a despreader (648) responsive to the digitally filtered signal (647), for providing a despread signal (650);
a decoder (656), responsive to the despread signal (650), for providing an output signal (658),
wherein the wireless communication network employs wideband code division multiple access.

28. The mobile device of claim 26, wherein the mobile device (102) employs uplink frequencies which are separated from downlink frequencies by a duplex spacing.

29. The mobile device of claim 17, wherein the elements claimed by claim 18 allow the mobile device (102) to operate uninterrupted with continuous reception capacity and continuous communication capacity prior to handover.

30. The mobile device of claim 17, wherein the handover information signal (622) has a magnitude indicative of a requested frequency channel that is untested by the mobile device (102) and to which a handover is requested.

31. A system for avoiding adjacent channel interference and reducing disconnections caused thereby, during communication via a communication channel in a wireless communication network, comprising:
a mobile device (102) responsive to a received signal transmitted over a wireless interface, for providing a handover information signal having a magnitude indicating at least a power ratio of adjacent channel interference to communication channel power; and
a radio network subsystem (128), for providing the received signal to the mobile device (102), and being responsive to the handover information signal by switching the communication to an alternative communication channel if the power ratio exceeds a certain threshold,
wherein the power ratio is determined inside the mobile device by measuring signal power before and then after the received signal is filtered by at least one selected filter,
wherein both the communication channel and the alternative communication channel are for communication between the mobile device (102) and a base station (202); and
wherein the power ratio is substantially determined by adjacent channel power divided by communication channel power, the communication channel power being substantially given by the magnitude of the filtered signal, and the adjacent channel power being calculated as a function of both the magnitude of the filtered signal and the magnitude of the received signal.

32. The system of claim 31, wherein the certain threshold is a constant associated with the mobile device.

33. The system of claim 31, wherein the certain threshold is determined by the radio network subsystem (128).

34. The system of claim 31, wherein the at least one selected filter comprises a digital pulse shaping filter.

35. The system of claim 31, wherein the alternative communication channel connects the mobile device (102) to the radio network subsystem (128).

36. The system of claim 31, wherein the alternative communication channel connects the mobile device (102) to a different radio network subsystem.

37. A network element for avoiding adjacent channel interference and reducing disconnections caused thereby, during communication via a communication channel in a wireless communication network, comprising:
means for providing a received signal by transmission over a wireless interface;
means for receiving a handover information signal responsive to the received signal, the handover information signal having a magnitude indicating at least a power ratio of adjacent channel interference to communication channel power; and
means for switching the communication to an alternative communication channel if the power ratio exceeds a certain threshold,
wherein the power ratio is based upon signal power before and then after filtering,
wherein both the communication channel and the alternative communication channel are for communication with the network element; and
wherein the power ratio is substantially determined by adjacent channel power divided by communication channel power, the communication channel power being substantially given by the magnitude of the filtered signal, and the adjacent channel power being calculated as a function of both the magnitude of the filtered signal and the magnitude of the received signal.

38. A computer readable medium encoded with a software data structure for performing the method of claim 1.

39. A software product for avoiding adjacent channel interference and reducing disconnections caused thereby, during communication between a mobile device (102) and a base station (202) that communicate via a communication channel in a wireless communication network, the software product comprising a computer readable medium having executable codes embedded therein; the codes, when executed, adapted to facilitate the steps of:
   measuring (302) received power of a received signal at a point before the received signal is filtered by at least one selected filter within the mobile device (102), for providing a received power measurement signal having a magnitude indicative thereof,
   filtering (304) the received signal, for providing a filtered signal,
   remeasuring (306) post-filter power of the filtered signal, for providing a filtered power measurement signal having a magnitude indicative thereof,
   estimating (308) from the received power measurement signal and the filtered power measurement signal a power ratio having a magnitude indicative of a degree to which the adjacent channel interference exceeds communication channel power, and
   requesting (314) a handover to an alternative communication channel available for data transmission to and from the mobile device via said alternative communication channel, if (310) said power ratio is greater than a certain threshold,
wherein the steps of measuring (302), filtering (304), remeasuring (306), and estimating (308) are performed while the mobile device is capable of using the communication channel for receiving and transmitting data,
wherein both the communication channel and the alternative communication channel are for communication between the mobile device (102) and the base station (202); and
wherein the power ratio is substantially determined by adjacent channel power divided by communication channel power, the communication channel power being substantially given by the magnitude of the filtered signal, and the adjacent channel power being calculated as a function of both the magnitude of the filtered signal and the magnitude of the received signal.

40. An electronic chip product having a hardware circuit for use in a mobile device (102) that communicates with a base station (202) via a communication channel in a wireless communication network, comprising circuit components for facilitating the steps of:
   measuring (302) received power of a received signal at a point before the received signal is filtered by at least one selected filter within the mobile device (102), for providing a received power measurement signal having a magnitude indicative thereof,
   filtering (304) the received signal, for providing a filtered signal,
   remeasuring (306) post-filter power of the filtered signal, for providing a filtered power measurement signal having a magnitude indicative thereof,
   estimating (308) from the received power measurement signal and the filtered power measurement signal a power ratio having a magnitude indicative of a degree to which the adjacent channel interference exceeds communication channel power, and
   requesting (314) a handover to an alternative communication channel available for data transmission to and from the mobile device via said alternative communication channel, if (310) said power ratio is greater than a certain threshold,
wherein the steps of measuring (302), filtering (304), remeasuring (306), and estimating (308) are performed while the mobile device is capable of using the communication channel for receiving and transmitting data,
wherein both the communication channel and the alternative communication channel are for communication between the mobile device (102) and the base station (202); and
wherein the power ratio is substantially determined by adjacent channel power divided by communication channel power, the communication channel power being substantially given by the magnitude of the filtered signal, and the adjacent channel power being calculated as a function of both the magnitude of the filtered signal and the magnitude of the received signal.

* * * * *

UNITED STATES PATENT AND TRADEMARK OFFICE
CERTIFICATE OF CORRECTION

| | | |
|---|---|---|
| PATENT NO. | : 7,043,242 B2 | Page 1 of 1 |
| APPLICATION NO. | : 09/773275 | |
| DATED | : May 9, 2006 | |
| INVENTOR(S) | : T. Kuiri et al. | |

It is certified that error appears in the above-identified patent and that said Letters Patent is hereby corrected as shown below:

At col. 13, line 67, please change "claim 18" to --claim 17--.

Signed and Sealed this

Twenty-ninth Day of August, 2006

JON W. DUDAS
*Director of the United States Patent and Trademark Office*